United States Patent
Tonetti et al.

(10) Patent No.: US 7,044,118 B2
(45) Date of Patent: May 16, 2006

(54) METHOD AND DEVICE FOR CONTROLLING INJECTION IN AN INTERNAL COMBUSTION ENGINE, IN PARTICULAR A DIESEL ENGINE WITH A COMMON RAIL INJECTION SYSTEM

(75) Inventors: Marco Tonetti, Turin (IT); Andrea Ruggiero, Giaveno (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 0 days.

(21) Appl. No.: 10/367,976

(22) Filed: Feb. 19, 2003

(65) Prior Publication Data

US 2003/0221680 A1 Dec. 4, 2003

(30) Foreign Application Priority Data

Feb. 19, 2002 (IT) ............................... TO02A0143

(51) Int. Cl.
*F02D 41/14* (2006.01)

(52) U.S. Cl. ...................... 123/674; 123/679; 123/698

(58) Field of Classification Search ................ 123/674, 123/679, 698

See application file for complete search history.

(56) References Cited

U.S. PATENT DOCUMENTS

| | | | | |
|---|---|---|---|---|
| 5,247,445 A | * | 9/1993 | Miyano et al. | 123/674 |
| 5,657,737 A | * | 8/1997 | Ishida et al. | 123/674 |
| 6,234,156 B1 | * | 5/2001 | Muto | 123/674 |
| 6,431,160 B1 | * | 8/2002 | Sugiyama et al. | 123/674 |
| 6,712,053 B1 | * | 3/2004 | Kobayashi et al. | 123/674 |
| 2001/0032637 A1 | * | 10/2001 | Grieve et al. | 123/674 |

FOREIGN PATENT DOCUMENTS

| | | |
|---|---|---|
| DE | 39 43 207 A1 | 7/1990 |
| DE | 198 31 748 A1 | 1/2000 |
| JP | 63-272940 | 11/1998 |
| WO | WO 99/18343 | 4/1999 |

* cited by examiner

*Primary Examiner*—Erick Solis
(74) *Attorney, Agent, or Firm*—Berenato White & Stavish LLC

(57) ABSTRACT

There is described a method of controlling injection in a vehicle internal combustion engine, wherein the intake air flow and exhaust lambda are measured to estimate the fuel quantity actually injected into the engine and perform a closed-loop control whereby the estimated fuel quantity is made to substantially equal the nominal fuel quantity calculated to meet vehicle user requirements. More specifically, the difference between the nominal fuel quantity and the estimated fuel quantity is used to calculate a correction factor by which to correct the nominal fuel quantity.

22 Claims, 2 Drawing Sheets

METHOD AND DEVICE FOR CONTROLLING INJECTION IN AN INTERNAL COMBUSTION ENGINE, IN PARTICULAR A DIESEL ENGINE WITH A COMMON RAIL INJECTION SYSTEM

The present invention relates to a method and device for controlling injection in an internal combustion engine.

More specifically, the present invention may be used to advantage, though not exclusively, in direct-injection diesel engines featuring a common rail injection system, to which the following description refers purely by way of example.

BACKGROUND OF THE INVENTION

As is known, in current internal combustion engines, the quantity of fuel actually injected into each cylinder at each injection may differ, even widely, from the nominal fuel quantity calculated by the electronic central control unit controlling injection according to user requirements, and which is currently used to determine the energization time of the injectors.

Various factors account for the difference between the nominal and actually injected fuel quantities, foremost of which are fabrication process spread and time-drift variations in injector characteristics, aging of the injection system, the effect on injection of so-called pressure waves, etc.

The difference between the theoretical and actually injected fuel quantities has extremely negative effects—especially on exhaust gas emission levels, on account of the engine operating at other than the design mixture ratio—and at any rate contributes in aggravating performance spread of engines equipped with this type of injection system.

SUMMARY OF THE INVENTION

It is an object of the present invention to provide an injection control device and method designed to eliminate the aforementioned drawbacks.

According to the present invention, there are provided a method and device for controlling injection in an internal combustion engine, as claimed in claims 1 and 11 respectively.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
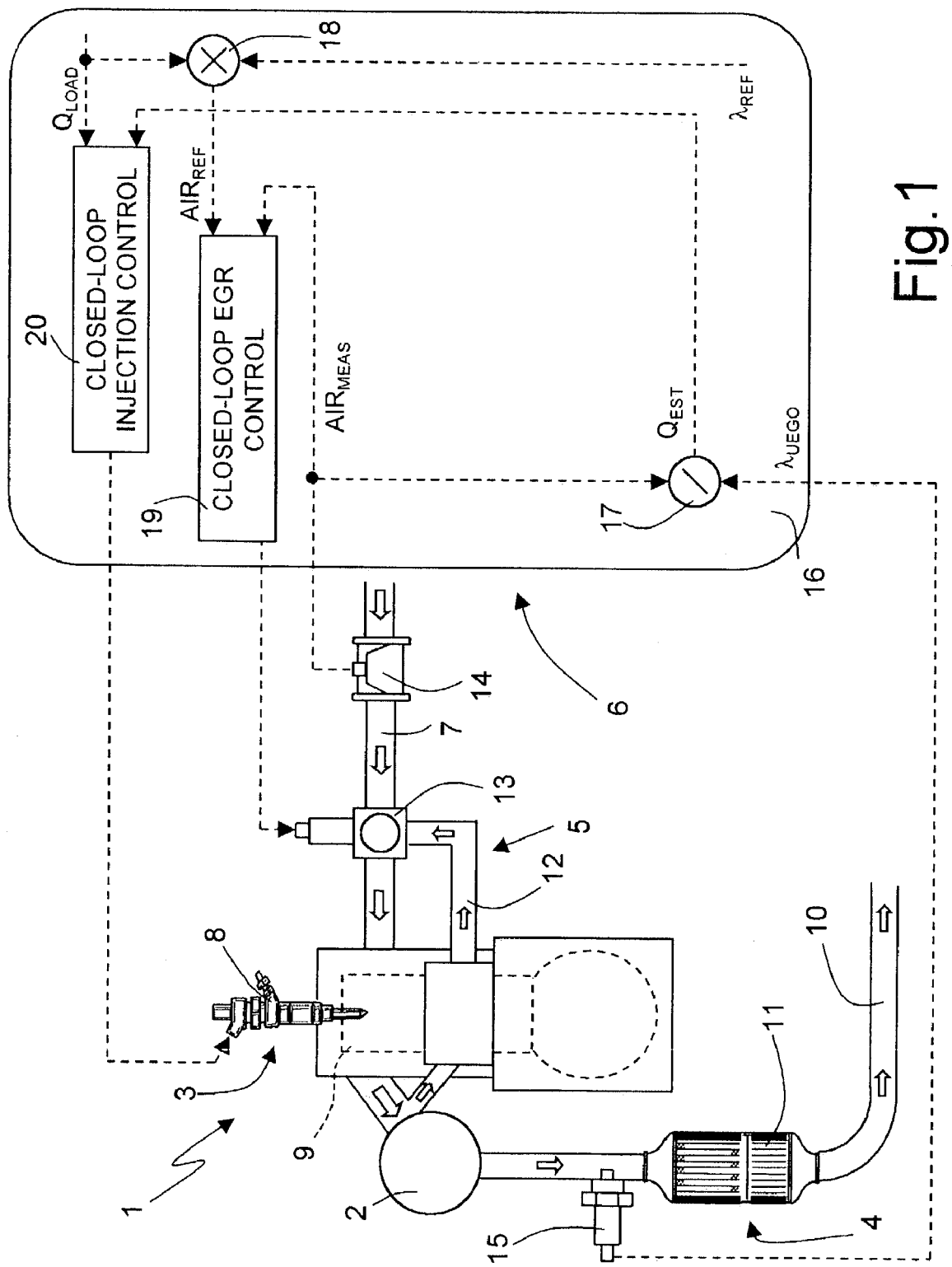
FIG. 1 shows a highly schematic diagram of injection control according to the present invention.

Number 1 in FIG. 1 indicates a supercharged direct-injection diesel engine comprising a variable-geometry turbosupercharger 2; a common rail injection system 3; a combustion gas exhaust system 4; an exhaust gas recirculation (EGR) system 5; and an electronic control system 6 for controlling injection and diagnosing injection system leakage. More specifically, of the above systems and the electronic control system, FIG. 1 only shows the parts strictly pertinent to a clear understanding of the present invention.

A more detailed description of the above systems can be found, for example, in European Patent Application 00104651.5 filed by the Applicant on Apr. 3, 2000 and published under number EP1035314 on Sep. 13, 2000.

More specifically, common rail injection system 3 comprises an air intake manifold 7, along which, as is known, is fitted a normally electrically controlled throttle valve (not shown); a number of injectors 8—one for each cylinder 9 of engine 1 (and only one of which is shown)—supplying high-pressure fuel to cylinders 9 of engine 1; a high-pressure feed circuit (not shown) supplying high-pressure fuel to injectors 8; and a low-pressure feed circuit (not shown) supplying low-pressure fuel to the high-pressure feed circuit.

At each engine cycle and in each cylinder 9 of engine 1, common rail injection system 3 implements a fuel injection strategy involving multiple consecutive injections comprising a main injection, performed around the end-of-compression top dead center position; a first preinjection preceding the main injection and performed at the compression stroke; a second preinjection preceding the main injection and following the first preinjection; a first post-injection following the main injection; and a second post-injection following the first post-injection and performed at the exhaust stroke; the second preinjection and the first post-injection being performed close enough to the main injection to take part with it in actual fuel combustion.

More details about the above multiple injections can be found in the aforementioned European patent application.

Exhaust system 4 comprises an exhaust manifold 10, along which are cascaded turbosupercharger 2, an oxidizing catalytic preconverter 11 close to turbosupercharger 2, possibly a particulate filter (not shown), and an actual oxidizing catalytic converter (not shown) upstream from the particulate filter.

Exhaust gas recirculating system 5 provides for feeding part of the exhaust gas produced by engine 1 back into air intake manifold 7, to lower combustion temperature and reduce the formation of nitric oxides (NOx), and is shown schematically by an exhaust gas recirculating conduit 12 connecting exhaust manifold 10, at a point upstream from turbosupercharger 2, to air intake manifold 7, at a point downstream from the throttle valve, and to a regulating or so-called EGR solenoid valve 13 located at the end of exhaust gas recirculating conduit 12, at the point where this comes out inside air intake manifold 7.

Electronic control system 6 comprises, among other things, an air flow meter (debimeter) 14 located along air intake manifold 7, upstream from the throttle valve, and supplying an electric signal indicating intake air flow $AIR_{MEAS}$; a proportional oxygen concentration sensor or so-called UEGO probe 15 located along exhaust manifold 10, between turbosupercharger 2 and oxidizing catalytic preconverter 11, and supplying an electric signal indicating the oxygen percentage in the exhaust gas, and more specifically proportional to the exhaust ratio, i.e. the air/fuel ratio of the burnt mixture (A/F); and an electronic central control unit 16 connected to air flow meter 14 and to oxygen concentration sensor 15, and supplying, among other things, signals for driving injectors 8, and a signal for driving EGR solenoid valve 13.

As regards the information supplied by oxygen concentration sensor 15, for the sake of simplicity in the following description, reference will be made, not to the exhaust ratio (A/F), but to a quantity known in engine technology as "exhaust lambda" (or "exhaust surplus air value") and indicated $\lambda_{UEGO}$, and which is none other than the exhaust ratio (A/F) normalized with respect to the stoichiometric ratio (14.56 for diesel fuel), i.e. is defined as the ratio between the exhaust ratio $(A/F)_{EXHAUST}$ and stoichiometric ratio $(A/F)_{STOICHIOMETRIC}$, i.e. $\lambda_{UEGO}=(A/F)_{EXHAUST}/(A/F)_{STOICHIOMETRIC}$.

Electronic central control unit 16 performs a closed-loop control of the quantity of fuel injected on the basis of exhaust lambda $\lambda_{UEGO}$, and a closed-loop control of the quantity of exhaust gas recirculated on the basis of intake air flow $AIR_{MEAS}$, by implementing the operations described below with reference to the operating block diagram shown in electronic central control unit 16 in FIG. 1.

More specifically, electronic central control unit 16 implements a first calculating block 17, which receives exhaust lambda $\lambda_{UEGO}$ and intake air flow $AIR_{MEAS}$, and supplies a total estimated fuel quantity $Q_{EST}$ calculated as the ratio between intake air flow $AIR_{MEAS}$ and exhaust lambda $\lambda_{UEGO}$, and indicating the total fuel quantity actually injected into the engine at each engine cycle.

Electronic central control unit 16 also implements a second calculating block 18, which receives a reference lambda $\lambda_{REF}$, stored in a map as a function of the operating point of the engine and representing an optimum value for reducing contaminating emissions, in particular NOx, and a total nominal fuel quantity $Q_{LOAD}$ indicating the total quantity of fuel to be injected into the engine at each engine cycle to meet user requirements, and calculated by electronic central control unit 16 on the basis of the accelerator pedal position, and supplies a reference air flow $AIR_{REF}$ calculated as the product of reference lambda $\lambda_{REF}$ and total nominal fuel quantity $Q_{LOAD}$, and indicating the air flow required in air intake manifold 7 to obtain reference lambda $\lambda_{REF}$.

Electronic central control unit 16 also implements an EGR control block 19 for closed-loop control of the quantity of exhaust gas recirculated; and an injection control block 20 for closed-loop control of the quantity of fuel injected.

More specifically, EGR control block 19 receives actual air flow $AIR_{MEAS}$ and reference air flow $AIR_{REF}$, and supplies an EGR solenoid valve drive signal generated as a function of the error between actual air flow $AIR_{MEAS}$ and reference air flow $AIR_{REF}$, so as to bring both to the same value, i.e. so that actual air flow $AIR_{MEAS}$ in air intake manifold 7 equals reference air flow $AIR_{REF}$, which in turn is a function of reference lambda $\lambda_{REF}$. More specifically, the EGR solenoid valve drive signal is generated as a function of the error between actual air flow $AIR_{MEAS}$ and reference air flow $AIR_{REF}$ by implementing a known PID (Proportional Integral Derivative) control not described in detail.

Injection control block 20, on the other hand, receives total nominal fuel quantity $Q_{LOAD}$ and total estimated fuel quantity $Q_{EST}$, and supplies a drive signal for injectors 8 generated as a function of the error between total nominal fuel quantity $Q_{LOAD}$ and total estimated fuel quantity $Q_{EST}$, so as to bring both to the same value, i.e. so that the total fuel quantity injected into engine 1 at each engine cycle equals the nominal fuel quantity calculated by electronic central control unit 16.

More specifically, and as explained in more detail later on with reference to FIG. 2, the difference between total nominal fuel quantity $Q_{LOAD}$ and total estimated fuel quantity $Q_{EST}$ is used to calculate, in steady state, a correction coefficient by which to correct total nominal fuel quantity $Q_{LOAD}$. The drive signals for injectors 8 are then generated on the basis of the calculated total corrected fuel quantity, to ensure the total corrected fuel quantity is injected. In this way, the total fuel quantity actually injected is made equal to the total nominal fuel quantity $Q_{LOAD}$ calculated by electronic central control unit 16 to meet vehicle user requirements.

The final outcome of the combined injection and EGR control strategies is that the exhaust lambda measured by the UEGO probe equals the stored reference lambda. In mathematical terms, in fact, the closed-loop injection control based on the UEGO probe gives $Q_{LOAD}=Q_{EST}$ (1), while the closed-loop EGR control gives $AIR_{MEAS}=AIR_{REF}$ (2). But since $Q_{EST}=AIR_{MEAS}/\lambda_{UEGO}$ (3) and $AIR_{REF}=Q_{LOAD}*\lambda_{REF}$ (4), substituting (4), (2) and (3) in (1) in that order gives $\lambda_{UEGO}=\lambda_{REF}$.

Figure 2:
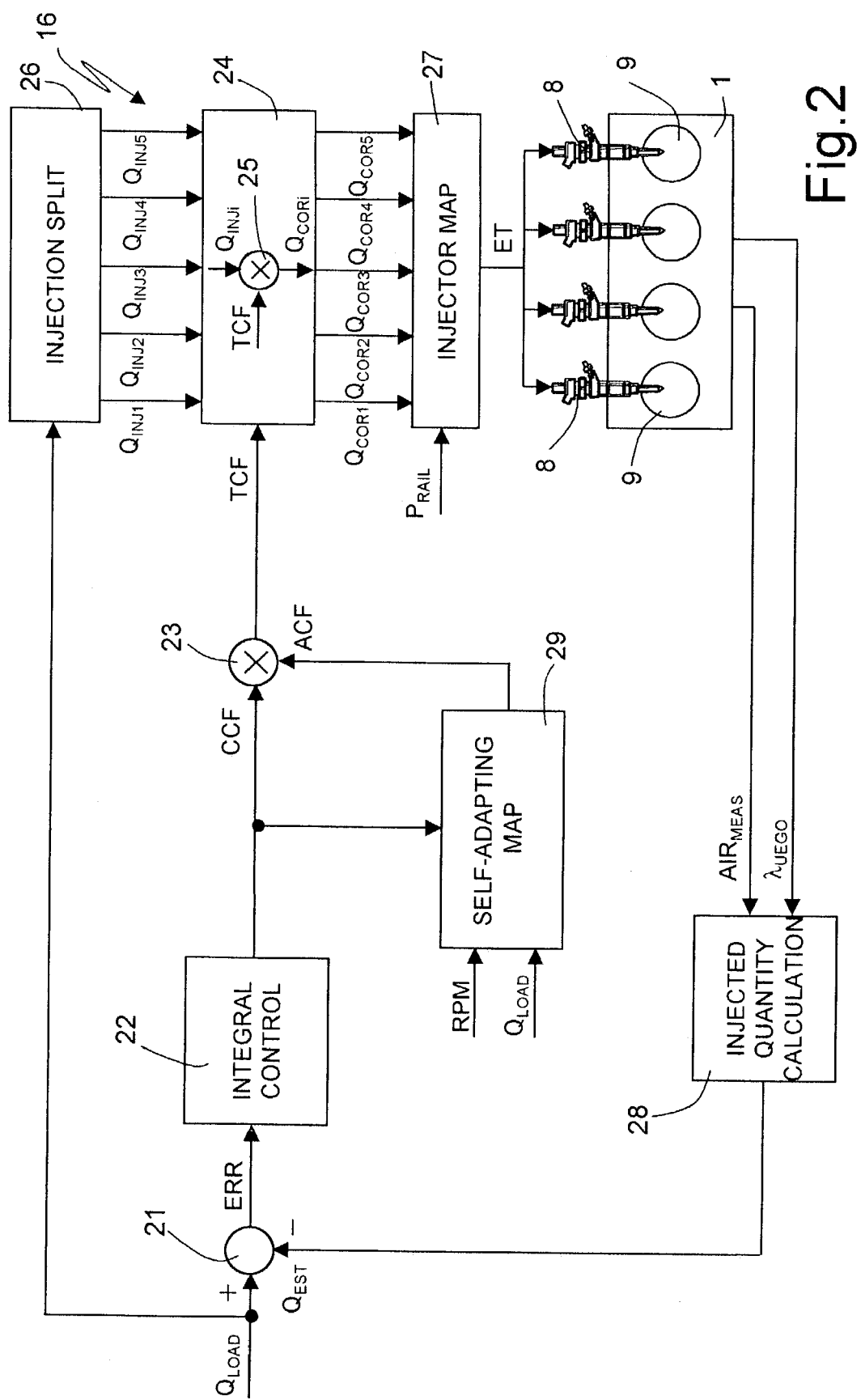
FIG. 2 shows a more detailed diagram of injection control according to the present invention.

FIG. 2 shows a more detailed block diagram of how electronic central control unit 16 actually performs the closed-loop control of the quantity of fuel injected according to the invention.

As shown in FIG. 2, electronic central control unit 16 implements a subtracting block 21, which receives total nominal fuel quantity $Q_{LOAD}$ and total estimated fuel quantity $Q_{EST}$, and supplies an injection error ERR equal to the difference between total nominal fuel quantity $Q_{LOAD}$ and total estimated fuel quantity $Q_{EST}$.

Electronic central control unit 16 also implements an integral control block 22, which receives injection error ERR, implements a straightforward known integral control not described in detail, and supplies a compensating correction factor CCF obtained by time integrating injection error ERR.

More specifically, the injection control performed by integral control block 22 has a response speed which must be relatively slow, by being subject to the read delays of the sensors employed, particularly the UEGO probe, but above all because it must in no way be perceived by the vehicle user, or interfere with idling speed control, handling of the vehicle, or any other vehicle control devices (ASR, MSR, ESP, etc.).

Control by integral control block 22 is only enabled when the UEGO probe is thermally steady, and no conditions exist wherein control is disabled as a function of the temperature of engine 1.

Electronic central control unit 16 also implements a multiplication block 23, which receives compensating correction factor CCF and a self-adapting correction factor ACF described below, and supplies a total correction factor TCF equal to the product of compensating correction factor CCF and self-adapting correction factor ACF.

Electronic central control unit 16 also implements an injection correction block 24 for making a proportional or multiplication correction, as a function of total correction factor TCF, of the fuel quantity injected at each of the multiple injections performed in each engine cylinder at each engine cycle.

More specifically, the injection correction block comprises a number of multiplication blocks 25, one for each of the multiple injections performed in each cylinder at each engine cycle, and each of which receives total correction factor TCF, and a respective single nominal fuel quantity $Q_{INJi}$ indicating the fuel quantity to be injected at the relative multiple injection, and supplies a corrected fuel quantity $Q_{CORi}$ equal to the product of respective single nominal fuel quantity $Q_{INJi}$ and total correction factor TCF.

Injection correction block 24 also provides for selecting whether to correct all or only some of the multiple injections.

The single nominal fuel quantities $Q_{INJi}$ supplied to injection correction block 24 are calculated by an injection splitting block 26 as a function of total nominal fuel quantity $Q_{LOAD}$ and depending on the required injection strategy. In each case, the sum of single nominal fuel quantities $Q_{INJi}$ must equal the total nominal fuel quantity $Q_{LOAD}$ calculated by electronic central control unit 16 to meet user requirements.

The corrected fuel quantities $Q_{CORi}$ are supplied to an energization block 27, which calculates injector energization time for each of the multiple injections and for each injector 8 as a function of the fuel pressure $P_{RAIL}$ in the injection system common rail, so as to ensure the corrected fuel quantities $Q_{CORi}$ are injected. More specifically, in energization block 27, a nominal energization map is stored defining the energization time-injected quantity characteristic of an injector as a function of the fuel pressure $P_{RAIL}$ in the common rail, i.e. containing a respective injector energization time value for each corrected fuel quantity $Q_{CORi}$ value and each common rail fuel pressure value. Appropriate injector drive signals ET are then generated on the basis of the calculated energization times.

Electronic central control unit 16 also implements a calculating block 28, which receives exhaust lambda $\lambda_{UEGO}$ and intake air flow $AIR_{MEAS}$, and supplies total estimated fuel quantity $Q_{EST}$ as the ratio between intake air flow $AIR_{MEAS}$ and exhaust lambda $\lambda_{UEGO}$, and which is supplied to subtracting block 21 to calculate injection error ERR.

Self-adapting correction factor ACF is supplied by a self-adapting block 29 as a function of the operating point of the engine, as defined by speed and load, i.e. engine speed RPM and total nominal fuel quantity $Q_{LOAD}$.

More specifically, in self-adapting block 29, a self-adapting map is stored containing a respective self-adapting correction factor ACF value for each combination of engine speed RPM and total nominal fuel quantity $Q_{LOAD}$ values.

The self-adapting map must be differentiated if different injection maps exist (number of injections per engine cycle, injection lead, fuel quantity injected, injection pressure), i.e. a number of self-adapting maps may be stored in the self-adapting block, each relating to a respective injection map, in turn relating to a respective engine or vehicle operating condition.

In the case in question, if provision is made for an injection map for use with the engine at steady temperature and in normal operating conditions, an injection map for use when the engine is cold, and an injection map for use when regenerating the particulate filter (DPF—diesel particulate filter) or DeNOx catalyst (NOx adsorber), three self-adapting maps are stored in the self-adapting block, each relating to and used in one of the above conditions.

In any one of the above conditions, the corresponding self-adapting map is enabled, and supplies a self-adapting correction factor ACF as a function of the operating point of the engine, as defined by speed and load. When the injection system is operating correctly, the self-adapting correction factor ACF must assume values in the region of 1 (e.g. ranging between 0.8 and 1.2).

In addition to the above conditions, whenever a steady-state condition is encountered (i.e. speed and load remain more or less constant for a given length of time), the self-adapting map being used at the time is written or updated.

More specifically, the compensating correction factor CCF calculated by the integral control block is entered into the self-adapting map, in the box relative to the current engine operating point, and is multiplied by the value already in the box.

To avoid continually rewriting the self-adapting map unnecessarily, the above operation is only performed when the compensating correction factor CCF is significantly other than 1 (e.g. less than 0.99 or greater than 1.01). In each case, the self-adapting correction factor ACF values stored in the self-adapting map are limited to a range equal to or slightly higher than the permitted compensating correction factor CCF range (e.g. 0.7 to 1.3).

The compensating correction factor CCF values stored in self-adapting map boxes adjacent to the box containing the updated value may in turn be updated by an appropriate update propagation strategy. And at the same instant the self-adapting map is updated, the integral control block is reset (compensating correction factor CCF equals 1) to ensure continuous torque supply.

Total correction factor TCF, equal to the product of compensating correction factor CCF and self-adapting compensating factor ACF, is used to individually correct single fuel quantities $Q_{INJi}$ of the various multiple injections and obtain corrected fuel quantities $Q_{CORi}$. Using energization map 27 (which remains unchanged), drive signals ET for supply to the injectors are obtained to ensure the desired fuel quantity is actually injected.

If the self-adapting map has been modified when electronic central control unit 16 is turned off, the new self-adapting map is saved (typically in an EEPROM) and reloaded the next time the unit is turned on.

To better control update propagation, each self-adapting map is provided with a corresponding update map, which memorizes which boxes in the relative self-adapting map have been updated directly.

It should be stressed that, in the FIG. 2 control structure, the self-adapting correction factor supplied by the self-adapting map is mainly responsible for correcting the quantity of fuel injected at a given engine operating point and in given operating conditions (injection pressure, engine temperature, etc.), while the compensating correction factor supplied by the integral control block provides solely for compensating variations caused by current operating conditions differing from those in which the self-adapting map is updated. In fact, when current operating conditions coincide with those of the self-adapting map, the compensating correction factor equals 1.

The advantages of the present invention will be clear from the foregoing description.

In particular, the present invention provides for fully compensating all the factors (injector characteristic spread and time drift, injection system aging, pressure waves, etc.) responsible for the difference between nominal and actually injected fuel quantities, thus enabling considerable improvement in terms of exhaust gas emission levels and engine performance spread.

Moreover, defining a correction factor related to the current engine operating point, as opposed to a single correction factor, further provides for reducing emission levels and engine performance spread.

Another important point to note is that, like currently produced central control units, the strategy described above employs an air flow sensor (debimeter) for controlling recirculated exhaust gas flow (EGR), and therefore the lambda at which the engine actually operates. Like any other sensor, a debimeter is also subject to error, reading dispersion, and characteristic drift over time. In currently used strategies, an error in the intake air flow reading means an error in the operating lambda, which has a serious effect on polluting emissions. The strategy described above, however, enables the engine, even in the event of an intake air flow reading error, to operate with the desired lambda ($\lambda_{REF}$) and so avoid aggravating pollutant levels. This is due to the combined effect of the two EGR and injected quantity controls, the final outcome of which gives $\lambda_{UEGCO}=\lambda_{REF}$, i.e. the lambda measured by the UEGO probe (and at which the engine actually operates) exactly equals the one required by the central control unit (see the demonstration given above with reference to equations (1), (2), (3) and (4), which also applies in the event of an intake air flow reading error).

Finally, the correction factors supplied by the integral control block and self-adapting map may be used to advantage for diagnostic purposes, to determine the degree and rate of drift and correct operation of the injection system.

Clearly, changes may be made to the method and device as described and illustrated herein without, however, departing from the scope of the present invention, as defined in the accompanying claims.

For example, as opposed to being measured directly by a debimeter, air flow in the intake manifold may be determined indirectly from information supplied by other sensors.

Also, as opposed to being the product of the compensating correction factor and self-adapting correction factor, the total correction factor may even coincide solely with the self-adapting correction factor, and the compensating correction factor be used solely to update the self-adapting map.

The invention claimed is:

1. A method of controlling injection in an internal combustion engine (1), comprising the step of:
   determining a nominal fuel quantity ($Q_{LOAD}$) for injection into said engine (1) as a function of user requirements;
   characterized by also comprising the steps of:
   estimating the fuel quantity ($Q_{EST}$) actually injected into said engine (1) as a function of intake air flow ($AIR_{MEAS}$) and exhaust ratio ($\lambda_{UEGO}$);
   controlling fuel injection into said engine (1) so that the estimated fuel quantity ($Q_{EST}$) substantially equals said nominal fuel quantity ($Q_{LOAD}$).

2. A method as claimed in claim 1, characterized in that said step of controlling fuel injection into said engine comprises the steps of:
   generating a self-adapting map (29) storing a number of self-adapting correction factors (ACF), each related to a respective operating point of the engine as defined by speed and load;
   correcting said nominal fuel quantity ($Q_{LOAD}$), at a given operating point of the engine, as a function of the self-adapting correction factor (ACF) related to said operating point of the engine; and
   injecting the corrected fuel quantity ($Q_{COR}$) into said engine (1).

3. A method as claimed in claim 2, characterized in that said step of correcting said nominal fuel quantity ($Q_{LOAD}$) comprises the step of:
   making a proportional correction of said nominal fuel quantity ($Q_{LOAD}$) as a function of said self-adapting correction factor (ACF).

4. A method as claimed in claim 3, characterized in that said step of making a proportional correction comprises the step of:
   multiplying said nominal fuel quantity ($Q_{LOAD}$) by said self-adapting correction factor (ACF).

5. A method as claimed in claim 1, characterized in that said step of controlling fuel injection into said engine also comprises the steps of:
   determining a compensating correction factor (CCF) as a function of the difference between said estimated fuel quantity ($Q_{EST}$) and said nominal fuel quantity ($Q_{LOAD}$); and
   correcting said nominal fuel quantity ($Q_{LOAD}$) as a function of said compensating correction factor (CCF).

6. A method as claimed in claim 5, characterized in that said step of determining a compensating correction factor (CCF) comprises the steps of:
   determining an injection error (ERR) related to the difference between said estimated fuel quantity ($Q_{EST}$) and said nominal fuel quantity ($Q_{LOAD}$); and
   determining said compensating correction factor (CCF) as a function of the integral of said injection error (ERR).

7. A method as claimed in claim 5, characterized in that said step of correcting said nominal fuel quantity (QLOAD) as a function of said compensating correction factor (CCF) comprises the step of:
   multiplying said nominal fuel quantity ($Q_{LOAD}$) by said self-adapting correction factor (ACF) and said compensating correction factor (CCF).

8. A method as claimed in claim 5, characterized by also comprising the step of:
   updating said self-adapting map (29) as a function of said compensating correction factor (CCF).

9. A method as claimed in claim 8, characterized in that said step of updating said self-adapting map comprises, for a given operating point of the engine, the step of:
   replacing the self-adapting correction factor (ACF) relative to said operating point of the engine with the product of the self-adapting correction factor (ACF) itself and the compensating correction factor (CCF) 20 calculated for the same operating point of the engine.

10. A method as claimed in claim 1, characterized by also comprising the step of:
    controlling the exhaust gas quantity recirculated into said engine (1), so that the intake air flow ($AIR_{MEAS}$) substantially equals a reference air flow ($AIR_{REF}$) calculated as a function of said nominal fuel quantity ($Q_{LOAD}$) and a reference ratio ($\lambda_{REF}$).

11. A method as claimed in claim 1, wherein said internal combustion engine is a diesel engine.

12. A device for controlling injection in an internal combustion engine (1), and comprising:
    first calculating means (16) for determining a nominal fuel quantity (QLOAD) for injection into said engine (1) as a function of user requirements;
    characterized by also comprising:
    estimating means (28) for estimating the fuel quantity ($Q_{EST}$) actually injected into said engine (1) as a function of intake air flow ($AIR_{MEAS}$) and exhaust ratio ($\lambda_{UEGO}$); and
    first control means (20) for controlling fuel injection into said engine (1) so that the estimated fuel quantity ($Q_{EST}$) substantially equals said nominal fuel quantity ($Q_{LOAD}$).

13. A device as claimed in claim 12, characterized 15 in that said first control means (20) comprise:
    a self-adapting map (29) storing a number of~self-adapting correction factors (ACF), each related to a respective operating point of the engine as defined by speed and load;
    first correcting means (23, 24) for correcting said nominal fuel quantity ($Q_{LOAD}$), at a given operating point of the engine, as a function of the self-adapting correction factor (ACF) related to said operating point of the engine; and
    first injecting means f8) for injecting the corrected fuel quantity ($Q_{COR}$) into said engine (1).

14. A device as claimed in claim 13, characterized in that said first correcting means (23, 24) make a proportional correction of said nominal fuel quantity ($Q_{LOAD}$) as a function of said self-adapting correction factor (ACF).

15. A device as claimed in claim 14, characterized in that said first correcting means comprise first multiplication means (23, 24) for multiplying said nominal fuel quantity ($Q_{LOAD}$) by said self-adapting correction factor (ACF).

16. A device as claimed in claim 12, characterized in that said first control means (20) also comprise:
  second calculating means (21, 22) for calculating a compensating correction factor (CCF) as a function of the difference between said estimated fuel quantity ($Q_{EST}$) and said nominal fuel quantity (QLOAD); and
  second correcting means (23, 24) for correcting said nominal fuel quantity (QLOAD) as a function of said compensating correction factor (CCF).

17. A device as claimed in claim 16, characterized in that said second calculating means (21, 22) comprise:
  third calculating means (21) for calculating an injection error (ERR) related to the difference between said estimated fuel quantity ($Q_{EST}$) and said nominal fuel quantity ($Q_{LOAD}$); and
  fourth calculating means (22) for calculating said compensating correction factor (CCF) as a function of the integral of said injection error (ERR).

18. A device as claimed in claim 16, characterized in that said second correcting means (23, 24) comprise:
  second means (23, 24) for fuel quantity ($Q_{LOAD}$) by said correction factor (ACF) and said compensating correction factor (CCF).

19. A device as claimed in claim 16, characterized by also comprising:
  updating means (29, 30) for updating said self-adapting map (29) function of said compensating correction factor (CCF).

20. A device as claimed in claim 19, characterized in that, for a given operating point of the engine, said means (29, 30) replace the self-adapting correction factor (ACF) relative to said operating point of the engine with the product of the self-adapting correction factor (ACF) itself and the compensating correction factor (CCF) calculated for the same operating point of the engine.

21. A device as claimed in claim 12, characterized by also comprising:
  second control means (19) controlling the exhaust gas quantity recirculated into said engine (1), so that the intake air flow ($AIR_{MEAS}$) substantially equals a reference air flow ($AIR_{REF}$) calculated as a function of said nominal fuel quantity ($Q_{LOAD}$) and a stoichiometric lambda ($\lambda_{REF}$).

22. A device as claimed in claim 12, wherein the internal combustion engine is a diesel engine.

* * * * *